J. C. SWACKHAMER.
TOWING DEVICE.
APPLICATION FILED JAN. 2, 1920.
1,358,894.
Patented Nov. 16, 1920.
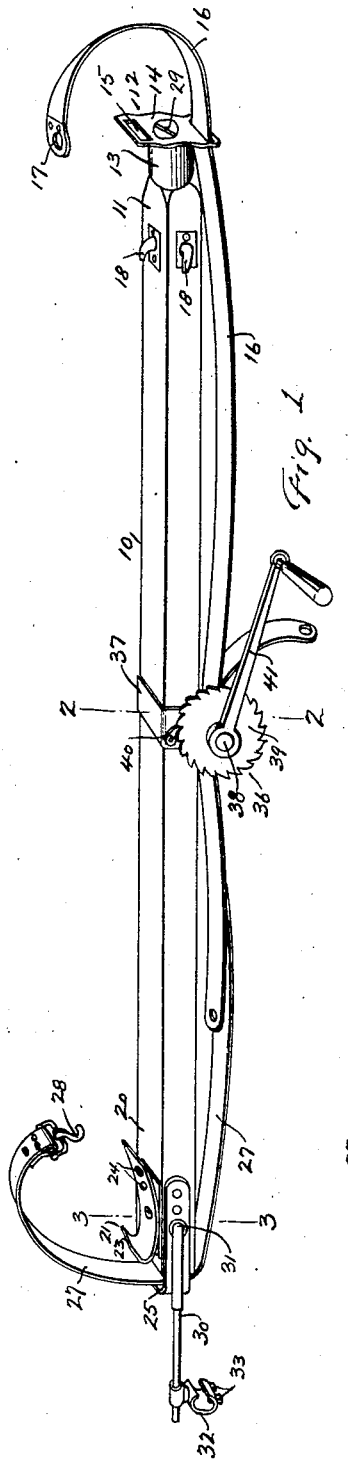

UNITED STATES PATENT OFFICE.

JACOB CLAYTON SWACKHAMER, OF NIAGARA FALLS, NEW YORK.

TOWING DEVICE.

1,358,894.  Specification of Letters Patent.  Patented Nov. 16, 1920.

Application filed January 2, 1920. Serial No. 348,805.

*To all whom it may concern:*

Be it known that I, JACOB CLAYTON SWACKHAMER, a citizen of the United States of America, and a resident of the city of Niagara Falls, county of Niagara, and State of New York, have invented certain new and useful Improvements in Towing Devices, of which the following is a full, clear, and exact description.

My invention relates generally to towing devices and more particularly to a device for use in connection with the towing of automobiles.

The principal object of my invention has been to provide a device of this nature which may be quickly attached, and one having an inflexible towing pole, so that the towing automobile and the one being towed shall be rigidly connected together and held at a substantially constant distance from each other.

Another object has been to provide a towing device so designed that it may be connected to the reach rod of the steering mechanism of the towed automobile, whereby this automobile may be towed and steered without having an attendant at the steering wheel thereof.

Other objects have been to provide a towing device which shall be cheap to manufacture; one universal in its application; and one very durable in its construction.

The above objects and advantages have been accomplished by the device shown in the accompanying drawings, of which:

Figure 1 is a perspective view of my complete device.

Fig. 2 is a fragmentary, longitudinal, sectional view taken on line 2—2 of Fig. 1.

Fig. 3 is a similar, sectional view taken on line 3—3 of Fig. 1.

Fig. 4 is a fragmentary end view of the device showing it attached to the axle and reach rod of the automobile being towed.

Fig. 5 is a fragmentary end view of the front end of the device, showing it attached to the rear axle of the automobile which is towing.

Fig. 6 shows a modification of the windlass of my device.

My invention comprises a rigid towing pole 10 preferably of square-shaped cross-section. To each end of this pole I provide suitable attaching means. On the forward end 11 of the pole, which is to be attached to the rear axle or any other suitable part of the towing automobile, I provide a swivel 12. This swivel is provided with a cylindrical hub 13 which is rotatably mounted on the outer end of the pole and held in place by a screw 29 or other suitable means, whereby it may be rotated upon the end of the pole. A plate 14 forms a part of the swivel and it is preferably arranged at right angles to the hub 13. This plate is provided with a slot 15 at each end thereof for the reception and passage of the flexible belt 16. The plate is designed to bear against any part of the towing automobile to which it is attached, and the belt 16 is arranged to pass around this part, for instance, the rear axle housing 19, shown in Fig. 5. The belt is passed through the lower slot 15 of the plate and then around the object to which the device is attached, and after being passed through the upper slot 15, the eyelet 17 formed at the extreme outer end of the belt is attached to one of the hooks 18. Two hooks 18 are preferably provided, one on each of any two adjacent sides of the pole, preferably the top and one of the sides, as shown in Figs. 1 and 5. By this arrangement the plate 14 may occupy the position shown in Figs. 1 and 5 or it may be rotated 90°, and a hook 18 will be provided for the eyelet 17 of the belt when in either position.

An axle plate 21 is provided at the rear end 20 of the pole. This axle plate is preferably pivotally secured to an attaching plate 22, which in turn is secured to the upper face of the pole 10. This axle plate is provided at its outer end with a hook 23 and at its inner end with a plurality of apertures 24. This plate is slightly curved as shown, so that it may more readily fit different sized axles and also so that it may freely swivel on the attaching plate 22. A U-shaped metallic strap 25 is arranged at the end 20 of the pole and has its legs secured to each side thereof. The strap is so positioned that a space 26 is provided between the body thereof and the extreme outer end of the pole. A flexible belt 27, which is provided with a hook 28 at its outer end is arranged to pass up through the opening or space 26 and over the front axle 51 of the car being towed as shown in Fig. 4. The hook 28 is then passed through the aperture 24 nearest the axle.

A steering arm 30, having a right-angled bearing portion 31 is mounted at the rear end 20 of the pole and has its bearing portion 31 passing through the pole and the legs of the strap 25. This portion 31 is so positioned that its axis is preferably in the same vertical plane as the pivotal point of the axle plate 21. The steering arm 30 extends rearwardly and is provided with a sliding clamp 32. This clamp is provided with set screws 33 or other suitable means for clamping it to the reach rod 34 of the steering gear of the towed automobile. It will be seen that as the pole 10 is oscillated around the pivotal point of the axle plate 21, the rearwardly extending steering arm 30 will operate the reach rod so as to steer the automobile being towed without the assistance of an attendant at the steering wheel.

Arranged preferably at the center of the pole 10 is a windlass 36. In the form shown in Fig. 1, this windlass comprises a U-shaped yoke 37, slidably disposed upon the pole 10 and having a shaft 38 passing through and rotatably mounted in the depending arms of the yoke. A ratchet wheel 39 is secured to the shaft 38, and a ratchet pawl 40, mounted on the yoke 37 is engageable with the teeth of the ratchet wheel. A suitable crank 41 is also secured to the shaft 38 whereby the same may be rotated.

The portion of the shaft which lies between the depending legs of the yoke 37 is provided with a centrally arranged slot 42, through which the inner ends of the flexible belts 16 and 27 are arranged to pass, as shown in Fig. 2. As shown in this figure, the belts are superimposed and the belt 16 is passed around the shaft and through the slot with its free end lying on top of the belt 27, and the end of the belt 27 is wound around the shaft with its free end lying below the belt 16. It will be seen that, as the shaft 38 is rotated in a clockwise direction, the belts will be wound tightly upon each other and upon the shaft and that the tighter they are drawn the tighter will be the gripping action of the windlass.

In Fig. 6, I show a modified form of actuating means for the windlass. A lever 43 is rotatably mounted upon the outer end of the shaft 38 and arranged between the ratchet wheel 39 and a collar 44 secured to the shaft. A pawl 45 is carried by the lever 43 and is operated from the handle of the lever in a well known way. A ratchet pawl 46 is, of course, also provided for retaining the ratchet wheel 39 in its set position.

When my device is to be put into use the forward end 11 of the pole 10 is placed against the rear axle or other desired part of the towing automobile and the outer end of the belt 16 passed around the selected part and then through the upper slot 15 of the swivel plate 14. The eyelet of this belt is then fastened to one of the hooks 18. The rear end 20 of the pole is then placed so that the front axle 51 of the towed automobile is in contact with the axle plate 21 and in engagement with the hook 23 thereof. The outer end of the belt 27 is now passed around the axle as shown in Fig. 4, and the hook 28 is passed through the nearest accessible hole 24 of the axle plate. The inner ends of the belts 16 and 27 having been previously placed within the slot 42 of the shaft 38, it will be seen that, by rotating the windlass 36 in a clockwise direction, the belts 16 and 27 will be tightly wound about the shaft 38 and tightly draw them in contact with the axle housing 50 of the towing automobile and the axle 51 of the towed automobile. Inasmuch as the yoke 37 is slidably mounted upon the pole 10, it will automatically adjust itself so that the windlass will produce an even pull or tension upon the belts 16 and 27 and thereby hold each fastening means in place with an equal degree of firmness. This makes it possible to attach the device to parts of different size without making it necessary to be particular as to the length of the belts 16 and 27. By these means the pole 10 will be firmly attached to each of the automobiles and connect them together so that the distance between them shall be fixed. When the clamp 32 is connected to the reach rod 34, as shown in Fig. 4, of the towed automobile, this car will be steered by the oscillating motion of the pole 10, as hereinbefore described. In automobiles where the reach rod is disposed in front of the axle instead of behind it, as shown in Fig. 4, the steering arm 30 will be turned so that it extends upwardly to a point where it may be clamped to the reach rod.

Obviously, some modifications of the details herein shown and described may be made without departing from the spirit of my invention or the scope of the appended claims, and I do not, therefore, wish to be limited to the exact embodiment herein shown and described; the form described being merely a preferred embodiment thereof.

Having thus described my invention, what I claim is:

1. A towing device comprising an inflexible towing pole, attaching means at each end of the pole, and means carried by the pole for tightening both attaching means at one time.

2. A towing device comprising an inflexible towing pole, attaching means at each end of the pole, a windlass mounted on the pole, and means connecting it with the attaching means.

3. A towing device comprising an inflexible towing pole, attaching means at each end of the pole, a windlass slidably mounted on the pole, and means connecting it with the attaching means.

4. A towing device comprising an inflexible towing pole, attaching means at each end of the pole, flexible members forming part of said attaching means and a slidably mounted windlass carried by the pole for controlling the attaching means, comprising a shaft, means for connecting the flexible members to the shaft, a ratchet, and means for rotating the shaft, whereby both attaching means are operated simultaneously.

5. A towing device comprising an inflexible towing pole, attaching means at each end of the pole, means carried by the pole for tightening both attaching means at one time, a steering arm carried by the pole, and means for connecting the steering arm with the steering gear of the car being towed.

6. A towing device comprising an inflexible towing pole, a swivel at the forward end of the pole, a belt passing through the swivel, means for fastening the outer end of the belt, an axle plate pivotally mounted on the rear end of the pole, a belt having its outer end passing around the end of the pole, means for fastening the outer end of the last mentioned belt to the plate, and means carried by the pole for tightening both belts.

7. A towing device comprising an inflexible towing pole, attaching means at the forward end of the pole comprising a swivel and a belt, attaching means at the rear end of the pole comprising an axle plate and a belt, and a windlass carried by the pole and provided with a shaft having a slot with which the inner ends of both belts are arranged to engage, and means for rotating the shaft to draw the belts taut.

8. A towing device comprising an inflexible towing pole, attaching means at each end of the pole, a windlass mounted on the pole, means connecting the windlass with the attaching means, a reversible steering arm carried by the pole, and means for connecting the steering arm with the steering gear of the car being towed.

9. A towing device comprising an inflexible towing pole, attaching means at each end of the pole, a reversible steering arm carried by the pole, means for connecting the steering arm with the steering gear of the car being towed, flexible means forming part of said attaching means, a slidably mounted windlass carried by the pole for controlling the attaching means, comprising a shaft, means for connecting the flexible members to the shaft, a ratchet, and means for rotating the shaft, whereby both attaching means are operated simultaneously.

In testimony whereof I have hereunto signed my name.

J. CLAYTON SWACKHAMER.